United States Patent [19]

Phillips

[11] Patent Number: 5,063,704
[45] Date of Patent: Nov. 12, 1991

[54] FISHING FLY WITH SLIDING TREBLE HOOK

[76] Inventor: Randall M. Phillips, N. 4113 Willow, Spokane, Wash. 99206

[21] Appl. No.: 565,937

[22] Filed: Aug. 13, 1990

[51] Int. Cl.$^5$ ............................................. A01K 85/00
[52] U.S. Cl. ................................. 43/42.25; 43/42.23; 43/42.49; 43/44.83
[58] Field of Search ................. 43/42.25, 42.74, 42.08, 43/42.23, 42.49, 44.82, 44.83

[56] References Cited

U.S. PATENT DOCUMENTS

| | | | |
|---|---|---|---|
| 1,592,600 | 7/1926 | Hickmann | 43/42.25 |
| 1,601,292 | 9/1926 | Burns | 43/44.83 |
| 1,781,598 | 11/1930 | Peckinpaugh | 43/42.25 |
| 2,532,961 | 12/1950 | Steen | 43/42.25 X |
| 3,848,354 | 11/1974 | Austad et al. | 43/42.49 |

*Primary Examiner*—Richard K. Seidel
*Assistant Examiner*—Patty E. Hong

[57] ABSTRACT

An artificial fishing fly having a trailing treble hook connected for floating motion toward and away from the fly body to attract fish, balance the fly, and position the treble hook advantageously for a strike when a fish bites short of the main fishhook. The floating connection of the treble hook is provided by a flexible loop extending to the rear of the fly body and extended through the treble hook eye and looped around its shank so that the treble hook can float freely back and forth along the length of the loop.

4 Claims, 1 Drawing Sheet

FISHING FLY WITH SLIDING TREBLE HOOK

BACKGROUND AND SUMMARY OF THE INVENTION

This invention relates generally to artificial fishing flies and more particularly to a fly which includes a trailing treble hook having a unique manner of connection with the fly body so that the treble hook can float or slide toward and away from the fly body.

In accordance with the invention, a fly body is equipped with a rearwardly extending loop formed from fishing line or another relatively stiff material. The loop is extended through the eye of the treble hook and is looped around its shank in order to connect the treble hook with the fly body. This manner of connecting the treble hook provides a relatively loose, slip tight connection which permits the treble hook to float or slide generally along the length of the loop toward and away from the fly body. This movement of the treble hook attracts fish to the fly and situates the treble hook in an advantageous position for a strike when, as often happens, a fish bites short of the main hook. At the same time, the treble hook functions as a keel and helps to balance the fly in the water so that it does not move in an unbalanced or otherwise instable fashion. These benefits are attained without adding significantly to the cost or complexity of the fly and without requiring costly or unusual parts.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
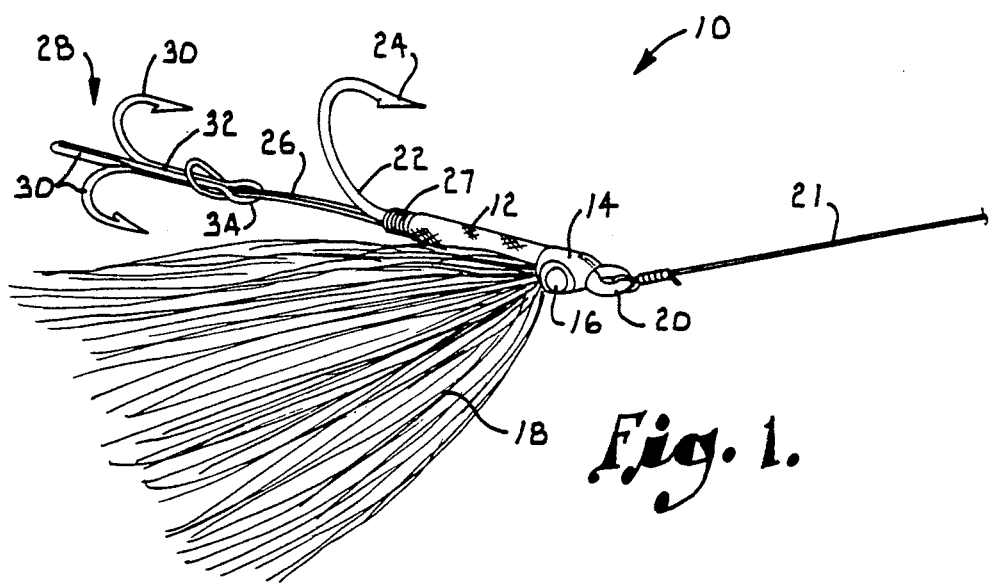
FIG. 1 is a perspective view showing a fishing fly constructed according to a preferred embodiment of the present invention attached to a fishing line.

Referring now to the drawings in more detail, numeral 10 generally designates an artificial fishing fly constructed in accordance with a preferred embodiment of the present invention. The fly 10 includes an elongated body 12 having a head 14 at one end. The head 14 is provided with a pair of eyes 16 (only one of which is visible in the drawings) and with a plurality of hair bristles 18 which extend generally rearwardly from the head 14 in a fan shape. The head 14 is equipped with an attachment eye 20 to which a fishing line 21 may be tied. The body 12, head 14, eyes 16 and bristles 18 may be colored as desired.

The eye 20 is formed on a relatively large fish hook 22, the shank of which extends through the body 12. The curved hook portion of the fish hook 22 extends from the tail end of the body 12 and terminates in a barb 24.

In accordance with the present invention, the tail end of the fly body 12 is provided with a flexible loop 26 which may be constructed of fishing line or any other relatively stiff line. The opposite ends of the loop extend into the tail end of the body 12 and are secured by any suitable means such as a sleeve 27 glued or otherwise secured on the shank of the fish hook 22. The loop 26 is thus connected with the fly body 12 to extend behind it.

Figure 3:
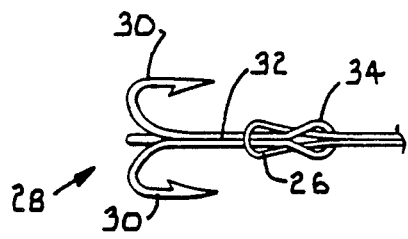
FIG. 3 is a fragmentary top plan view taken generally along line 3—3 of FIG. 2 in the direction of the arrows.

The fly 10 also includes a treble hook which is generally identified by numeral 28 and which includes three relatively small hooks 30 with their shanks 32 extending adjacent to one another and terminating at a common eye 34. The treble hook 28 is connected with the fly body 12 by means of the loop 26. The connection is a slip type connection which is established by extending the loop 26 through the eye 34 and then looping the loop around all three of the hooks 30 such that the loop eventually loops around the shank 32 of the treble hook, as best shown in FIG. 3. The slip connection allows the treble hook to slide back and forth on the loop 26.

Figure 4:
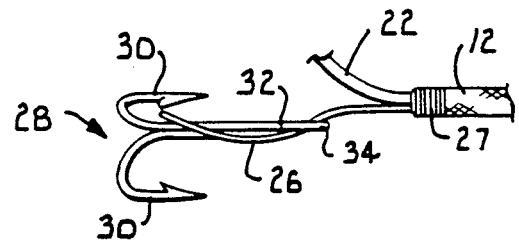
FIG. 4 is a fragmentary side elevational view similar to FIG. 2 but showing the treble hook of the fishing fly in a position where it has slipped forwardly along the flexible loop which connects it with the fly body.

In use, the fly 10 is used for fishing in the normal manner. The slip connection between the treble hook 28 and the loop 26 allows the treble hook to float or slide back and forth along the length of the loop 26. The eye 34 can slide along the loop 26 toward and away from the fly body 12 as the loop simultaneously moves along the length of the treble hook shank 32. The treble hook 28 can "float" in this fashion toward and away from the fly body 12 between the position of FIG. 3 where the treble hook is a relatively great distance behind the fly body and the position of FIG. 4 where the treble hook is relatively close to the fly body.

Figure 2:
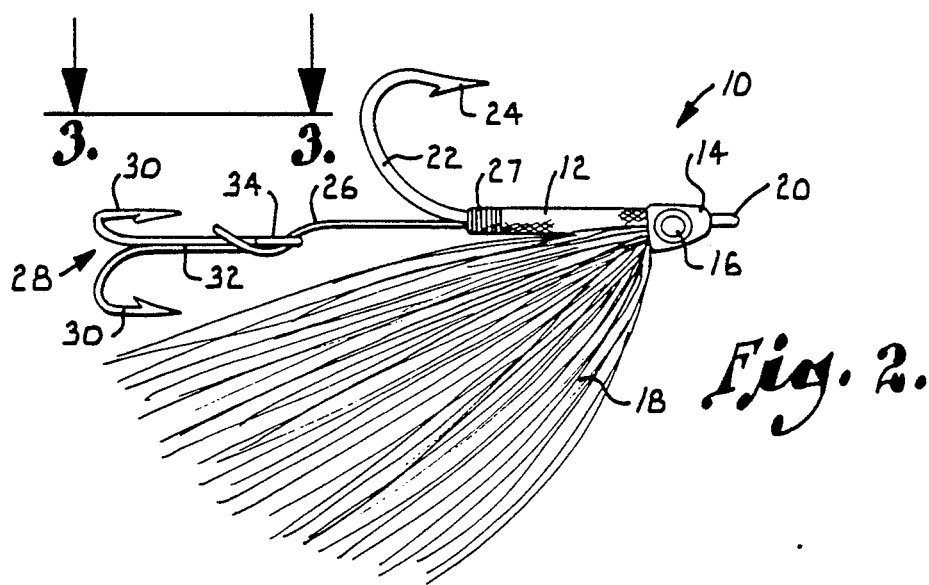
FIG. 2 is a side elevational view of the fly shown in FIG. 1.

As shown in FIGS. 1 and 2, the treble hook 28 is in a trailing position relative to the body 12, and the sliding motion of the treble hook that is permitted by the slip connection is helpful in attracting and catching fish. Because the treble hook is at a trailing position relative to the main fishhook 22 the hooks 30 are positioned advantageously for a strike in the event that a fish bites short of the main hook, as frequently occurs. The treble hook is able to float or slide back and forth and thereby help balance and stabilize the fly 10 so that it does not make unnatural movements that might frighten fish. The manner in which the treble hook is mounted allows it to function as a keel for stability of the fishing fly 10, and this further enhances the ability of the fly to attract fish.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without department from the scope thereof, it is to be understood that all matter herein set forth or shown in the accompanying drawings is to be interpreted as illustrative and not in a limiting sense.

Having thus described the invention, I claim:
1. A fishing fly comprising:
a fly body having opposite ends;

a hook on one end of said body;

means on the other end of said body for attaching a fishing line to the fly body;

a treble hook having an eye on one end and multiple hooks on another end, said treble hook having a shank extending between said eye and hooks;

a flexible line extending from said one end of the body, said flexible line presenting a loop; and a slideable slip connection between said flexible line and said treble hook wherein said loop is extended through said eye and is looped around said shank at a location between the eye and hooks to allow the shank to slide within said loop.

2. A fishing fly comprising:

a fly body having a fish hook on one end and means on another end for attachment to a fishing line;

a treble hook comprising a shank, plural hooks on one end of said shank and an eye on another end of said shank; and a flexible loop extending generally rearwardly from said fly body, said loop extending through said eye and being looped around said shank at a location between said eye and hooks to establish a slideable slip connection which permits the treble hook to float toward and away from the fly body in a trailing position thereto.

3. A fishing fly comprising:

a fly body having opposite ends and a hook fixed to one of said ends;

means on the other end of said body for attaching a fishing line to the fly body;

a trailing hook having an eye on one end, a curved hook on the other end and a shank extending between said eye and curved hook;

a flexible line extending from said one end of the fly body and presenting a loop behind the fly body; and a slideable slip connection between said flexible line and said trailing hook wherein said loop is extended through said eye and is looped around said shank at a location between the eye and curved hook to allow the shank to slide within the loop.

4. A fishing fly comprising:

a fly body having opposite ends and a hook fixed to one of said ends;

means on the other end of said body for attaching a fishing line to the fly body;

a treble hook having an eye on one end, multiple hooks on another end and a shank extending between said eye and hooks;

a flexible line extending from said one end of the fly body and presenting a loop behind the fly body; and a slideable slip connection of said loop with said treble hook to allow the treble hook to trail the fly body and to flex relative thereto, said loop extending through said eye and being looped around said shank at a location between said eye and hooks.

* * * * *